Oct. 14, 1969     F. L. MOFFITT     3,472,140

IMAGE MAGNIFICATION ADAPTER FOR CAMERAS

Filed Dec. 12, 1966     2 Sheets-Sheet 1

INVENTOR
FRED L. MOFFITT

BY
ATTORNEYS

Oct. 14, 1969     F. L. MOFFITT     3,472,140
IMAGE MAGNIFICATION ADAPTER FOR CAMERAS
Filed Dec. 12, 1966                 2 Sheets-Sheet 2

INVENTOR.
FRED L. MOFFITT
BY
ATTORNEYS

United States Patent Office 3,472,140
Patented Oct. 14, 1969

1

3,472,140
IMAGE MAGNIFICATION ADAPTER FOR CAMERAS
Fred L. Moffitt, Huntsville, Ala., assignor to the United States of America as represented by the Administrator of the National Aeronautics and Space Administration
Filed Dec. 12, 1966, Ser. No. 601,229
Int. Cl. G03b 3/00
U.S. Cl. 95—44                                2 Claims

ABSTRACT OF THE DISCLOSURE

An adapter unit for attachment to a camera, such as a Polaroid type, which permits the camera to produce magnified photographic views of subject matter of which enlarged views are desired. The adapter carries its own magnifying lens as well as its own illumination source and may be attached to or removed from a camera without any modification being required of the camera. In operation, the front end of the adapter will ordinarily be positioned in contact with or very near the subject matter being photographed and the illumination passes from a lighting compartment within the adapter to the subject matter being photographed with no external lighting source being required.

---

The invention described herein was made by an employee of the U.S. Government and may be manufactured and used by or for the Government for governmental purposes without the payment of any royalties thereon or therefor.

The present invention relates generally to photography and more particularly to an image magnification adapter for attachment to a camera, such as a Polaroid type camera.

In many situations in industrial and scientific work it is required or desired to obtain permanent visual records of magnified images of certain surfaces or objects. In the fields of entomology and geology, for example, permanent enlarged views of insects and rocks, respectively, are needed, and one of the principal uses of magnified images is in the field of quality control where defects in materials, such as textiles, plastics and metals, being manufactured or assembled, are photographed so that a permanent magnified view of the defects will be available for present and future analysis.

In the aerospace field, where quality and reliability considerations are extremely important, minute defects in missile and rocket components are often magnified and recorded by photography. For example, defects such as extremely small cracks in weldments joining metallic components of propellant tanks are magnified and recorded by photography, and the magnified views are studied as an aid in determining the nature, cause and seriousness of the defects.

Previously, magnified photographic views of minute weld cracks and other surface defects have been obtained by making a negative print of the particular surface where a defect has been found or suspected, and subsequently making enlargements from the negative print. This procedure involves considerable delay in developing and enlarging the prints as well as the requirement for setting up relatively elaborate and cumbersome camera and lighting equipment. Also, since the clarity of the photograph cannot be determined until after development of

2 the print, additional delay is sometimes experienced in realizing the necessity for retaking of the photograph.

Accordingly, it is a general object of the present invention to provide an improved means for making magnified pictures.

A more specific object of the invention is to provide a means for quick, easy and economical production of sharp, clearly defined, magnified pictures of the surface of a material under inspection or of defects in such surface.

A further object of the invention is to provide an adapter which may be readily combined with a standard camera, such as a Polaroid type camera, permitting such camera to produce clearly defined magnified pictures.

Another object of the invention is to provide a highly compact and portable camera device that may be maneuvered and operated in close and confined areas to produce high quality magnified pictures in a quick, easy and economical manner.

These and other objects and advantages of the invention will become apparent upon reference to the following specification, attendant claims and drawings:

Briefly described, the invention comprises an adapter for attachment to a standard commercially available camera, such as a Polaroid type camera, that imparts to the camera the ability to produce magnified pictures of extraordinary clarity and definition. The adapter includes a housing box that supports a magnifying lens near one end of the housing box and has an opening at the other end thereof. The subject matter to be photographed is ordinarily very close to or in contact with the open end of the housing, and the adapter carries its own source of illumination in a compartment offset from but communicating with the line of sight between the lens and the opening so that light travels from the illumination compartment on to the subject matter being photographed. A means for adjusting the amount of light proceeding from the light source to the subject may also be provided.

Figure 1:
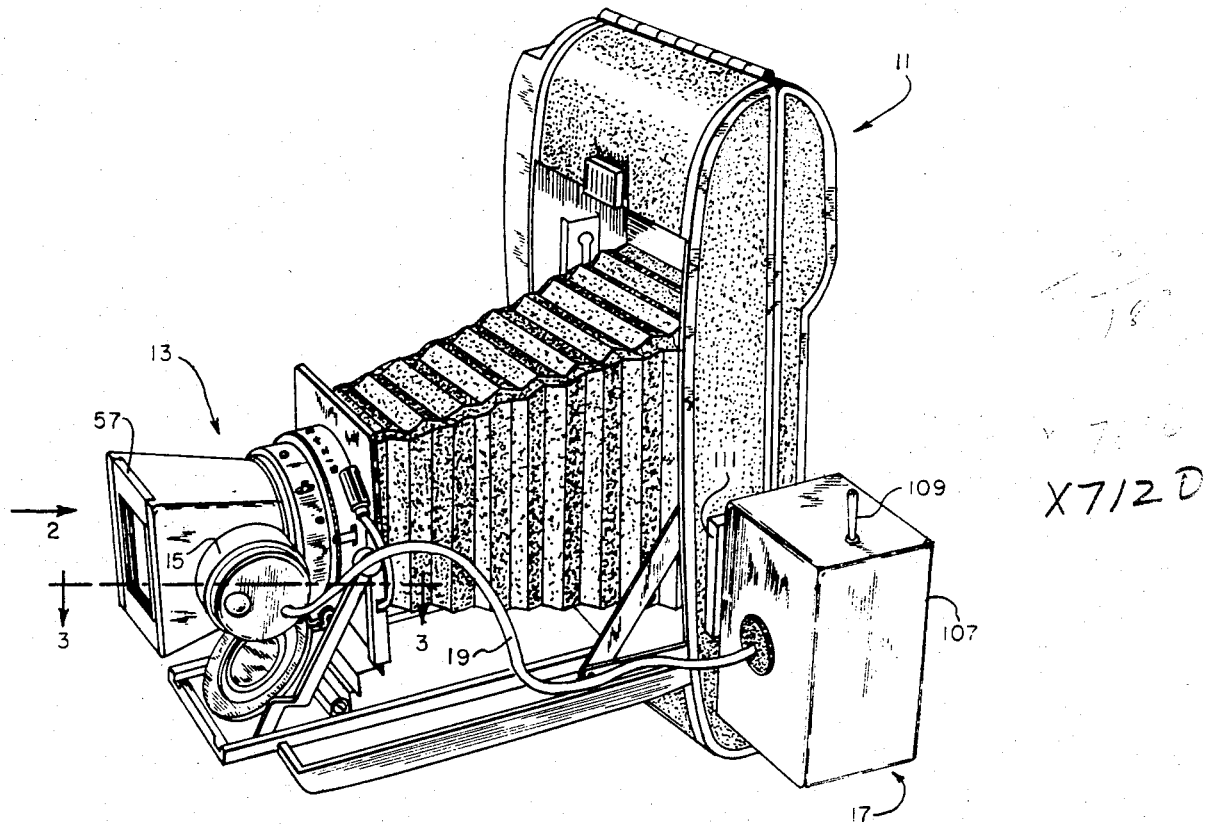
FIGURE 1 is a perspective view of a camera equipped with an image magnification adapter.

Referring now to FIGURE 1, there in is illustrated a Polaroid type camera 11 combined with an image magnification adapter 13 having an illumination compartment 15 connected to a power source 17 through wires 19. A detailed description of the camera 11 will not be included herein since the camera per se represents a well known commercially available type camera the details of which form no part of the present invention.

Figure 3:
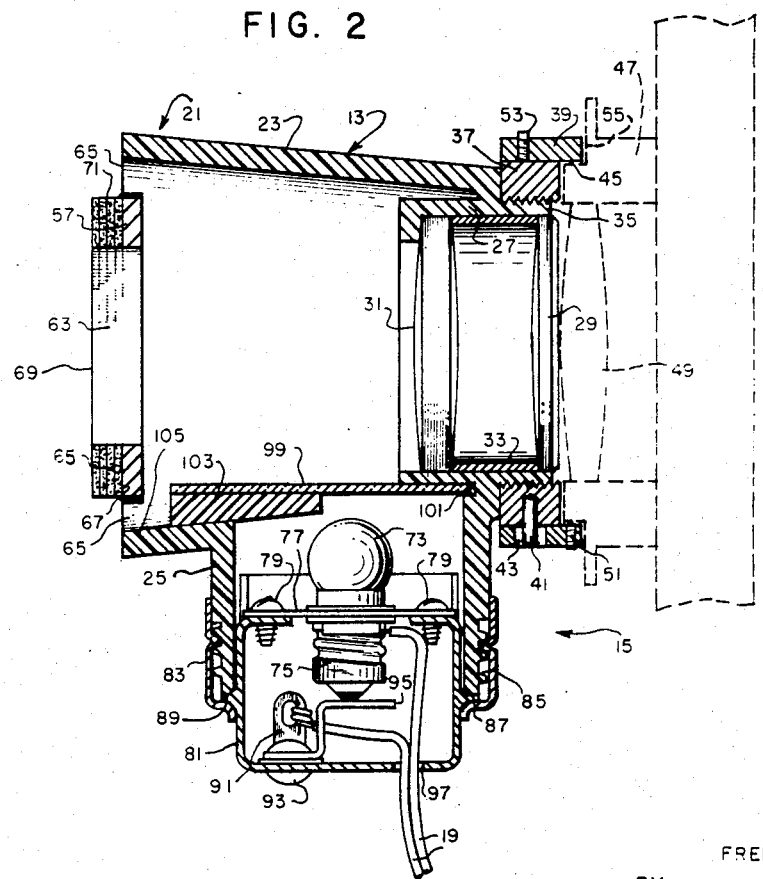
FIGURE 3 is a cross sectional view of the image magnification adapter taken along line 3—3 of FIGURE 1.

As shown in FIGURE 3, the adapter 13 comprises a housing 21 having a substantially pyramidal shaped body 23 and a tubular portion 25 with its longitudinal axis extending at right angles to the longitudinal axis of the body 23.

Formed at the smallest end of the body 23, as an integral part thereof, is an open ended cylindrical part 27 in which is mounted lenses 29 and 31, these lenses are being separated by an annular spacer 33. The cylindrical part 27 has an externally threaded projecting end 35 that threadedly receives a ring 37, and fitted over the ring 37 is a second ring 39 that is connected to the ring 37 by circumferentially spaced pins 41 extending through slots 43 in the ring 39. The width of the ring 39 exceeds that of the ring 37 to form a socket 45 that mates with and receives a front projecting portion 47 of the camera 11 which portion contains a front lens 49.

The adapter is secured to the camera 11 by set screws 51 circumferentially spaced around the second ring 39, while set screws 53 are used to fix the ring 39 to the ring 37 after the ring 39 is fitted against a shoulder 55 of the camera 11. When the adapter 13 is fitted to the camera 11 the lens 49 of the camera barely contacts the lens 29 of the adapter.

Figure 2:
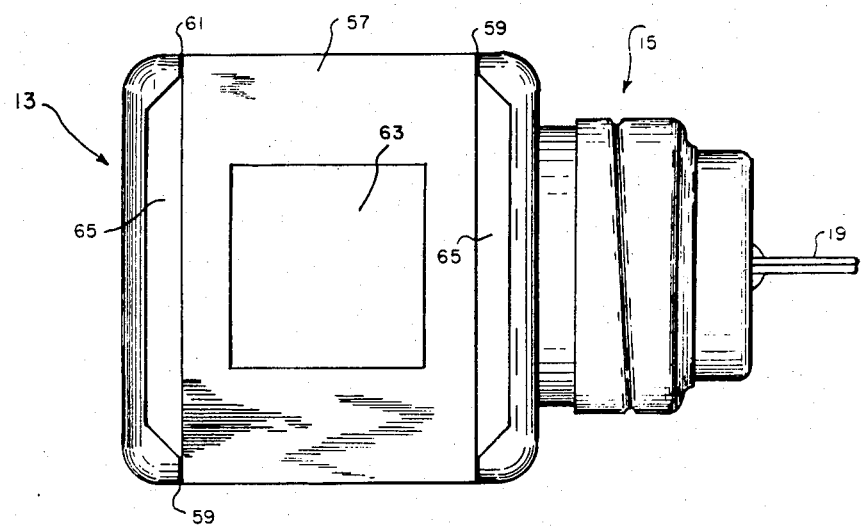
FIGURE 2 is a front elevation view of the image magnification adapter of FIGURE 1 taken in the direction of the arrow 2.

At the largest end of the body 23 of the adapter 13 is a mask 57 that fits in recesses 59 (FIGURE 2) formed in the end edge of the body 23 with an adhesive 61, such as epoxy resin, retaining the mask in place. The mask has a central opening 63 therein, and openings 65 remain between the body 23 and the upper and lower edges of the mask 57.

The mask 57 comprises a relatively thick element 67, the front surface of which is substantially aligned vertically with the end surface of the body 23, and a laminated element 69 comprising laminae 71, that is bonded to the element 67 and projects beyond the end surface of the body 23. The thickness and number of laminae 71 of the element 69 may be varied to provide a very fine depth of field adjustment as will be explained more fully hereinafter.

The line of sight of the adapter 13 coincides with the longitudinal axis of the body 23, extending from the lens 29 to the opening 63, and the line of sight of the adapter coincides with the line of sight of the camera 11 when attached thereto.

An illumination lamp 73 is screwed into a socket 75 mounted within the tubular portion 25 of the adapter, the socket being supported by a bracket 77 connected by screws 79 to a plug element 81 that fits in the tubular portion 25. The plug 81 is retained by a sleeve 83 that screws on tubular portion 25 engaging threads 85 and having an inturned flange 87 that bears on a stop 89 of the plug 81. A terminal 91 is mounted within the plug 81 by a rivet 93 which also secures a contact lug 95, the latter abutting against the base of the lamp 73.

One of the wires 19 is connected to the terminal 91 and the other wire is connected to the socket 75 and both wires pass out of the plug 81 through an aperture 97 and extend to the power source 17.

In order to provide for optimum adjustment of light emission and diffusion from the lamp 73 into the body 23 of the adapter and through the opening 63, a diffusing lens 99 is adjustably positioned between the illumination compartment 15 and the body 23. The rear edge of the lens 99 engages a slot 101 and the front portion of the lens rests on a wedge-shaped opaque shield 103 that is supported on a surface 105 of the body 23. The lens 99 diffuses the light and keeps it from concentrating at one point on the subject being photographed.

Movement of the shield 103 determines the amount of light permitted to pass through the lens 99 and also varies the angle of the lens slightly to affect the diffusion of the light. When the shield has been properly adjusted for a particular photograph situation the shield may be secured to the lens 99 as by adhesive, and the shield may also be adhesively secured to the surface 105.

Referring to FIGURE 1, the power source 17 comprises a small case 107 that contains appropriate batteries and a power switch 109. The case 107 is detachably connected to the camera 11 by a bracket 111 and a screw (not shown) that extends through the bracket and screws in the tripod mounting hole in the camera.

When it is desired to make a magnified photograph, the adapter 13 and the associated power source 17 are very quickly and easily attached to the camera 11, it being noted that no camera modification is required for it to receive the adapter or power source. The front end of the adapter, specifically the mask 57, is normally positioned in contact with or very near to the subject being photographed with the particular subject matter being encompassed within the opening 63.

When making a picture the best camera settings, such as f stop, shutter speed and focal distance, may vary depending on the particular type of camera being used and the magnification power of the lens in the adapter. The best settings for a particular camera and lens power are easily and expeditiously determined by experience, however, and it was found that with a Polaroid type camera (Models 110A and 110B), when using a 7× lens in the adapter, best results were obtained with the following settings: f stop, 16 to 32; shutter speed, 8; focal distance, either of the extremes of 3 feet or infinity.

By trial and error the light and the depth of field can be thoroughly optimized rapidly by adjusting the shield 103 and increasing or decreasing the number of laminae 71 of the mask 57 to produce magnified photographic views of extraordinary clarity. It has been found that the adjustment arrived at will be the optimum adjustment for the paricular camera for future photographs of the same or similar circumstances and, therefore, no future adjustments are necessary unless a different camera or subject matter of a different type is involved.

When the illumination has been adjusted properly the shield may be bonded to the lens 99 and the surface 105.

It is apparent from the preceding description that the invention provides a quick, easy and economical means for producing magnified photographic views. The photographs obtained are extremely sharp and clear, providing an excellent permanent record.

Obviously, many modifications and variations of the present invention are possible in light of the above teachings. It is, therefore, to be understood that within the scope of the attendant claims the invenion may be practiced other than as specifically described.

What is claimed is:
1. An adapter for attachment to a camera comprising:
 (a) a body portion having a line of sight passing from one end of said body portion to the other end thereof;
 (b) an illumination compartment offset from said line of sight and communicating with said line of sight so that light may pass from said compartment into said body portion;
 (c) a source of light within said illumination compartment;
 (d) a diffusion lens between said light source and said line of sight;
 (e) means for adjusting light passing through said diffusion lens;
 (f) a magnification lens mounted in said body portion adjacent one end of said body portion;
 (g) means at said one end of said adapter for attaching said adapter to a camera;
 (h) a mask element at the end of said adapter opposite said attaching means;
 (i) said mask element comprising a plurality of laminae whereby the number of said laminae may be varied to adjust the depth of field for taking a photograph.

2. An adapter for attachment to a camera comprising:
 (a) a body portion having a line of sight passing from one end of said body portion to the other end thereof;
 (b) an illumination compartment offset from said line of sight and communicating with said line of sight so that light may pass from said compartment into said body portion;
 (c) a source of light within said illumination compartment;
 (d) a diffusion lens between said light source and said line of sight;
 (e) means for adjusting light passing through said diffusion lens;
 (f) a magnification lens mounted in said body portion adjacent one end of said body portion;

(g) means at said one end of said adapter for attaching said adpter to a camera;

(h) said light adjusting means comprising a movable opaque shield adjacent said diffusion lens for varying the amount of light admitted through said lens.

References Cited

UNITED STATES PATENTS

| | | | |
|---|---|---|---|
| 3,195,431 | 7/1965 | Augustin et al. | 240—1.3 X |
| 3,198,097 | 8/1965 | Hine | 95—11 |
| 3,330,193 | 7/1967 | Kaess | 88—24 |
| 3,385,188 | 5/1968 | Ellman | 88—24 |
| 3,005,391 | 10/1961 | Ragan et al. | 95—11 |
| 2,959,097 | 11/1960 | Möllring | 240—1.3 X |

NORTON ANSHER, Primary Examiner

R. L. MOSES, Assistant Examiner

U.S. Cl. X.R.

240—1.3; 355—55

UNITED STATES PATENT OFFICE
CERTIFICATE OF CORRECTION

Patent No. 3,472,140 October 14, 1969

Fred L. Moffitt

It is certified that error appears in the above identified patent and that said Letters Patent are hereby corrected as shown below:

In the heading to the printed specification, lines 4 to 6, "Fred L. Moffitt, Huntsville, Ala., assignor to the United States of America as represented by the Administrator of the National Aeromautics and Space Administration" should read -- Fred L. Moffitt, 3720 Lakewood Road, N. W., Huntsville, Ala. 35811 --. Column 1, line 14 "Polaroid type" should read -- Polaroid Land Camera --; column 1, line 35, column 2, lines 13, 32, and 47, and column 4, line 10, "Polaroid type camera", each occurrence, should read -- Polaroid Land Camera --.

Signed and sealed this 6th day of October 1970.

(SEAL)
Attest:

Edward M. Fletcher, Jr.  WILLIAM E. SCHUYLER, JR.
Attesting Officer  Commissioner of Patents